Patented Feb. 6, 1951

2,540,915

UNITED STATES PATENT OFFICE 2,540,915

SEPARATION PROCESS

Benjamin B. Schaeffer, Niagara Falls, N. Y., assignor to Mathieson Chemical Corporation No Drawing. Application September 8, 1948,
Serial No. 48,331

3 Claims. (Cl. 260—650)

This invention relates to the separation of alkaryl compounds containing one or more sidechain halogen atoms from mixtures thereof with aromatic compounds free of side-chain halogen atoms, but having an unsaturated side chain and provides an improved commercially practical method whereby such separation may be economically accomplished, either continuously or batchwise.

The method is particularly valuable as applied in the separation of such alkaryl compounds from vinyl aromatic compounds which may or may not contain nuclear halogen atoms. Thus, it can be applied with excellent results in the separation of chloroethyl benzene from styrene, for example, or in the separation of chloroisopropyl benzene from alpha methyl styrene or in the separation of chloroethyl dichlorobenzene from dichlorostyrene.

Nuclear dichlorostyrenes, for instance, which are readily polymerizable to plastics having great commercial utility, are conveniently produced by the dehydrohalogenation of haloethyldichlorobenzene. Though styrene is much less readily polymerized and its polymers have much lower distortion temperatures than dichlorostyrenes and their polymers, it is likewise of considerable commercial utility. Styrene may be prepared by dehydrohalogenation of a haloethylbenzene. However, the reaction mixture resulting from the dehydrohalogenation in either case invariably contains substantial amounts of unreacted starting material. As compounds containing side-chain halogen adversely affect the rate and extent of polymerization, it is necessary to subject the dehydrohalogenation product to a treatment resulting in the removal of as much of the chloroethyl compound, for instance, as possible. A large proportion of the offending compound can be separated, of course, by fractional distillation, but in order to meet product specifications it is frequently necessary to carry the distillation treatment beyond commercially practicable limits. Even small amounts of the chloroethyl compound, having little, if any, effect on the polymerization of the styrene or dichlorostyrene, are objectionable where the polymeric material is to be employed in a molding operation carried out at elevated temperatures, since it has been found that polymers prepared from monomers containing such amounts of the chloroethyl compound are prone to evolve hydrogen chloride during such operations causing corrosion of the equipment, particularly the metal parts thereof.

The process of the invention is an extraction process characterized by the use of a watermiscible furane derivative selected from the class consisting of furfuryl alcohol, tetrahydrofurfuryl alcohol and tetrahydrofurane and their alkyl homologues as the extracting agent and is predicated upon my discovery that the solvent power of these compounds for aromatic compounds containing side-chain halogen is relatively greater than their solvent power for vinyl aromatic compounds free of side-chain halogen.

Although the present process is adapted to stepwise continuous operation, it is usually carried out batchwise. The mixture comprising an alkaryl compound containing a side-chain halogen atom and an aromatic compound free of sidechain halogen but containing an unsaturated side-chain is admixed with suitable proportions of the solvent selected from the above-identified class. To the homogeneous solution a suitable amount of water is added to effect stratification. The oil phase is then separated by decantation or in any other suitable manner and washed several times with water to remove the solvent completely. The purified vinyl aromatic is subsequently dried by known means and may be distilled if necessary. It is an important feature of the present invention that no other solvent is necessary due to the solubility of the solvents of the above-identified group in water.

In the practice of the present process, the relative proportions of the solvent and vinyl aromatic compound to be purified may vary within wide limits but mixtures containing from 25 to 75% of solvent are normally used with particular advantage. A mixture of equal volumes of solvent and vinyl aromatic has been found particularly advantageous with respect to vinyl aromatics obtained as described by the dehydrochlorination of chloroethyl aromatics where the crude material has been subjected to a preliminary distillation.

The amount of water used to effect stratification and to wash out the solvent may vary over wide limits. If, however, too small a proportion of water is used, an excessive number of washes are necessary in order to remove the solvent completely from the refined oil. On the other hand, the addition of too great a quantity of water may dilute the water-solvent mixture to the point where extraction of the side-chain halogen compounds from the vinyl aromatic will be less efficient. In general, about one to four parts of water may be added to two parts of the mixture of crude vinyl aromatic and solvent. I have found it particularly advantageous when using a prefractionated crude vinyl aromatic containing small amounts of side-chain chlorine compounds to use approximately one part of the crude vinyl aromatic, one part of solvent and about two parts of water.

The volume of solvent and water used in the extraction depends to a considerable extent on the proportion of side-chain chlorine compounds in the crude vinyl aromatics. In general, the greater the side-chain halogen content of the mixture to be treated, the greater amount of solvent and the lesser amount of water employed.

Each step of the present process is normally carried out at room temperatures but in some cases higher of lower temperatures may be advantageous.

The practice of the invention is further illustrated by the following examples which, however, are not to be taken as in any way restrictive of the scope thereof.

Example I

Mixed isomeric nuclear dichlorostyrenes were prepared by ring chlorination of ethyl benzene, fractionation, side-chain chlorination and fractionation, followed by catalytic vapor phase demuriation, washing, drying and fractionation. The resultant dichlorostyrene mixture contained 0.052% side-chain chlorine corresponding to 0.31% of chloroethyl dichlorobenzene. 80 parts by volume of furfuryl alcohol was added to 80 parts of the dichlorostyrene mixture resulting in a homogeneous solution which was then shaken with 300 parts by volume of water and allowed to settle to separate the vinyl aromatic phase. The latter was washed four times with about 300 parts water to remove the furfuryl alcohol and the treated monomer was dried over potassium carbonate. The purified dichlorostyrene monomer contained 0.018% of side-chain chlorine corresponding to 0.11% of chloroethyl dichlorobenzene. By repeating the treatment, the proportion of the side-chain chlorine contaminant may be reduced to negligible quantities.

Example II

Another sample of similarly prepared mixed isomeric nuclear dichlorostyrenes containing 0.061% of side-chain chlorine, corresponding to 0.360% of chloroethyl dichlorobenzene, was extracted as described in Example I. The resulting vinyl aromatic contained 0.013% of side-chain chlorine corresponding to 0.077% of chloroethyl dichlorobenzene. This represents the removal of 78.6% of the contaminant in one extraction.

Example III

Another sample of mixed isomeric nuclear dichlorostyrenes containing 0.046% of side-chain chlorine, corresponding to 0.271% of chloroethyl dichlorobenzene, was extracted once as described in Example I using tetrahydrofurane as the solvent. 45% of the chloroethyl dichlorobenzene was removed in one extraction as shown by the side-chain chlorine content of the purified vinyl aromatics, which was 0.026%, corresponding to 0.153% of chloroethyl dichlorobenzene.

Example IV

A sample of mixed isomers of nuclear dichlorostyrenes, 250 parts by volume, containing 0.036% of side-chain chlorine, equivalent to 0.212% of chloroethyl dichlorobenzenes, was agitated with an equal volume of tetrahydrofurfuryl alcohol. The mixture was then agitated with 500 parts of water, allowed to settle and the vinyl aromatic phase separated. The separated phase was then washed three times with 500 parts by volume of water to remove the tetrahydrofurfuryl alcohol and the purified oil phase was separated and dried with potassium carbonate. The purified dichlorostyrenes contained 0.018% side-chain chlorine corresponding to 0.106% chloroethyl dichlorobenzenes. Thus, in a single extraction 50% of the contaminant was removed.

In the foregoing examples, the amounts of side-chain halogen present in the vinyl aromatic mixtures, for instance, in the dichlorostyrene, were determined as follows: a weighed sample of about 10 milliliters of the contaminated dichlorostyrene is admixed in a hundred milliliter flask with 10 milliliters of absolute ethanol. 10 milliliters of N-alcoholic potash is added and the mixture is refluxed for about 16 hours. The contents of the flask are then washed into an Erlenmeyer flask with hot water and neutralized to phenolphthalein using 30% acetic acid. Potassium chromate indicator solution is then added and the mixture titrated for chloride by the addition of standard silver nitrate solution. Ordinarily 0.1-N-silver nitrate is used, but for particularly low percentages of side-chain chlorine 0.02-N or 0.05-N-silver nitrate may be preferred.

I claim:

1. Method of treating a mixture containing an alkaryl compound having one or more side-chain halogen atoms and an aromatic compound free of side-chain halogen atoms but having an unsaturated side chain to reduce the content of the alkaryl compound which comprises adding to the mixture a water-miscible furane derivative selected from the group consisting of furfuryl alcohol, tetrahydrofurfuryl alcohol, and tetrahydrofurane and their alkyl homologues, effecting stratification of the resultant mixture by the addition of water thereto whereby an aqueous phase containing a major portion of the solvent and a substantial proportion of the alkaryl compound and an oil phase containing the major portion of the aromatic compound free from side-chain halogen atoms are formed and separating the aqueous phase from the oil phase.

2. Method of treating a mixture of chloroethyl dichlorobenzene and dichlorostyrene to reduce the content of the chloroethyl dichlorobenzene which comprises adding to the mixture a water-miscible furane derivative selected from the group consisting of furfuryl alcohol, tetrahydrofurfuryl alcohol and tetrahydrofurane and their alkyl homologues, effecting stratification of the resultant mixture by the addition of water thereto whereby an aqueous phase containing a major portion of the solvent and a substantial proportion of the chloroethyl dichlorobenzene and an oil phase containing the major portion of the dichlorostyrene are formed and separating the aqueous phase from the oil phase.

3. Method of treating a mixture of chloroethyl dichlorobenzene and dichlorostyrene to reduce the content of the chloroethyl dichlorobenzene which comprises adding to the mixture a water-miscible furane derivative selected from the group consisting of furfuryl alcohol, tetrahydrofurfuryl alcohol and tetrahydrofurane and their alkyl homologues, effecting stratification of the resultant mixture by the addition of water thereto whereby an aqueous phase containing a major portion of the solvent and a substantial proportion of the chloroethyl dichlorobenzene and an oil phase containing the major portion of the dichlorostyrene are formed, separating the aqueous phase from the oil phase and washing the oil phase with water to remove residual solvent.

BENJAMIN B. SCHAEFFER.

No references cited.